No. 806,936. PATENTED DEC. 12, 1905.
R. L. STRINGFELLOW.
TRAP.
APPLICATION FILED APR. 3, 1905.

Witnesses
F. A. Barron
M. A. Schmidt

Robert Lee Stringfellow, Inventor
by
Milo B. Stevens & Co. Attorneys.

UNITED STATES PATENT OFFICE.

ROBERT LEE STRINGFELLOW, OF WHITE BLUFFS, TENNESSEE.

TRAP.

No. 806,936.  Specification of Letters Patent.  Patented Dec. 12, 1905.

Application filed April 3, 1905. Serial No. 253,562.

*To all whom it may concern:*

Be it known that I, ROBERT LEE STRINGFELLOW, a citizen of the United States, residing at White Bluffs, in the county of Dickson and State of Tennessee, have invented new and useful Improvements in Traps, of which the following is a specification.

My invention relates to a trap, and more particularly one which is self and ever set.

The object of the invention is to provide a trap which shall be simple in construction and effectively serve the purpose for which it is intended.

Figure 1:
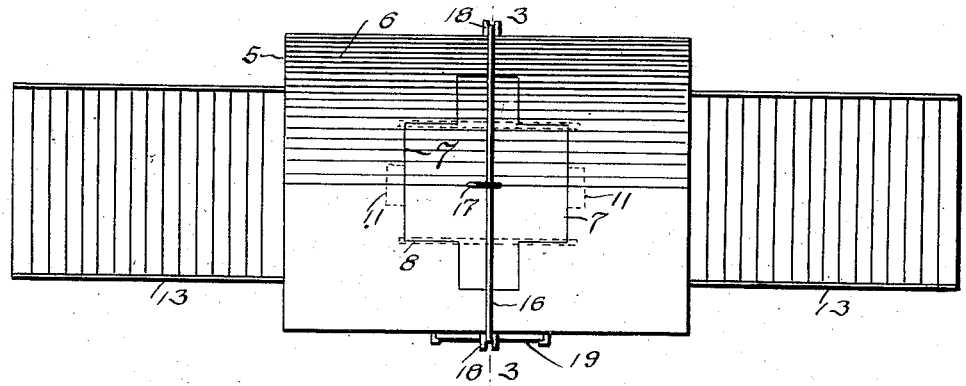
Figure 2:
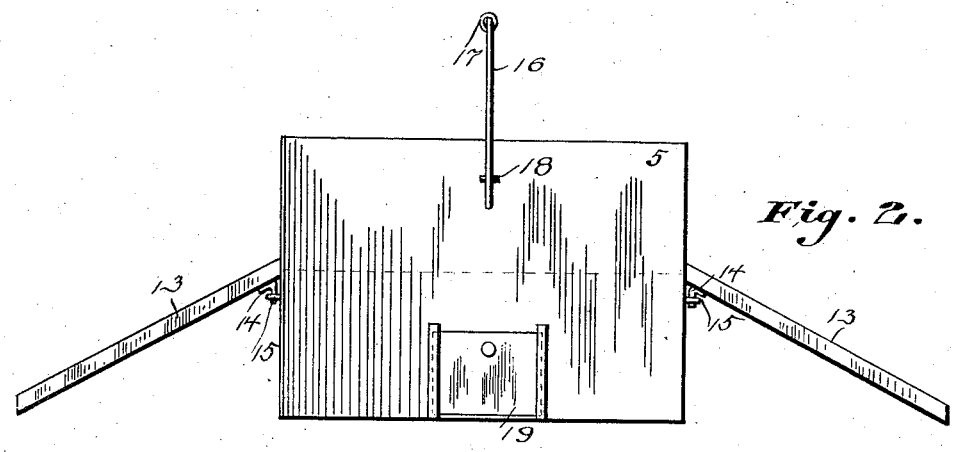
Figure 3:
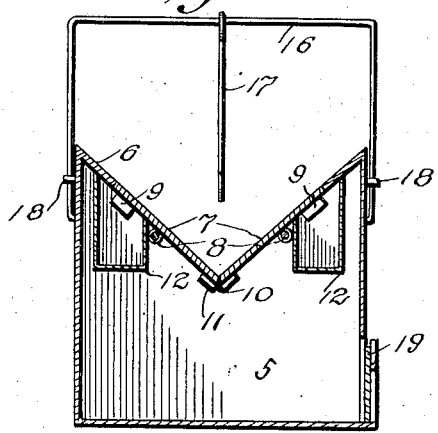
Figure 4:
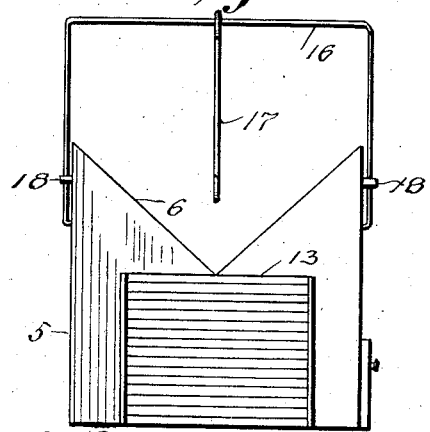

In the accompanying drawings, Figure 1 is a top plan view of the trap. Fig. 2 is a side elevation. Fig. 3 is a vertical sectional view on the line 3 3 of Fig. 1. Fig. 4 is an end view.

Referring specifically to the drawings, 5 denotes a box having a trough-shaped top 6. An opening is made in the top, which is closed by trap-doors 7. These doors are hung on opposite sides of the trough and swing on pivots 8 and are weighted, as at 9, whereby they are normally held closed. The doors meet at their lower edges at the bottom of the trough, which edges are beveled, as at 10, to make a perfect fit and also to prevent the doors from being swung upwardly to open. The doors also have projecting flanges 11, which extend under the top to prevent any possibility of the doors being pushed open from the inside of the box. The weights 9 are inclosed in compartments 12, so that they cannot be reached to push the doors open. Runways 13 are fastened to the ends of the box and extend to the floor. The upper ends of the runways have hooks 14, which enter eyes 15, secured to the ends of the box, and the runways are substantially of the same length as the box, so that they can be readily removed and placed on the top of the box for convenience in shipping the trap. The runways are crimped or corrugated, as shown, so that the animal may have a good foothold. A bail 16 is pivoted to the sides of the box, whereby convenient means are had for carrying the trap. The bail also supports a bait-hook 17, which is located directly over the doors. When the trap is in use, the bail is held upright by being placed in a catch 18 on the side of the box. A door 19 is provided for removing the trapped animals.

The operation of the trap is as follows: The animal attracted by the bait goes up the runway, and upon stepping on the doors they are tilted and the animal drops into the box, after which the doors are again closed by the weights 9 and the trap thus reset. The bait is so arranged that the animal cannot avoid stepping on the doors in reaching for it. The inclined sides of the trough prevent the animal from turning back, and if it endeavors to run across the top it will nevertheless be trapped.

A trap constructed as herein described is extremely simple and can therefore be cheaply made and sold. It is thoroughly efficient in operation, and as it is automatically reset it requires no attention except baiting it and removing the trapped animals.

Having thus described my invention, what is claimed as new, and desired to be secured by Letters Patent, is—

1. A trap comprising a box having a trough-shaped top provided with an opening therein; and trap-doors in said opening and having projecting flanges extending under the top.

2. A trap comprising a box having a trough-shaped top provided with an opening therein; trap-doors in said opening; weights on the doors and extending into the box for normally holding said doors closed; and compartments in the box inclosing the weights.

In testimony whereof I have signed my name to this specification in the presence of two subscribing witnesses.

ROBERT LEE STRINGFELLOW.

Witnesses:
W. W. JORDAN,
M. C. BOULDIN.